United States Patent
Komori et al.

(10) Patent No.: US 9,323,277 B2
(45) Date of Patent: Apr. 26, 2016

(54) CURRENT OUTPUT CIRCUIT AND WIRELESS COMMUNICATION APPARATUS

(71) Applicant: Panasonic Corporation, Osaka (JP)

(72) Inventors: Hiroshi Komori, Shiga (JP); Noriaki Saito, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 14/394,154

(22) PCT Filed: Feb. 5, 2014

(86) PCT No.: PCT/JP2014/000619
§ 371 (c)(1),
(2) Date: Oct. 13, 2014

(87) PCT Pub. No.: WO2014/125798
PCT Pub. Date: Aug. 21, 2014

(65) Prior Publication Data
US 2015/0056935 A1  Feb. 26, 2015

(30) Foreign Application Priority Data

Feb. 15, 2013  (JP) ................. 2013-028273

(51) Int. Cl.
H04B 1/40 (2015.01)
H04B 1/44 (2006.01)
G05F 3/26 (2006.01)
G05F 5/00 (2006.01)
H04B 1/16 (2006.01)

(52) U.S. Cl.
CPC .. G05F 5/00 (2013.01); G05F 3/26 (2013.01); H04B 1/40 (2013.01); H04B 1/1607 (2013.01)

(58) Field of Classification Search
CPC .......... H04B 1/40; H04B 1/44; H04B 7/0693; G05F 5/00; G05F 3/26
See application file for complete search history.

(56) References Cited

U.S. PATENT DOCUMENTS 4,596,948 A * 6/1986 Wall .................... G05F 3/24
                                                    323/312
5,990,711 A * 11/1999 Sekimoto .......... H03K 17/6871
                                                    323/316
(Continued)

FOREIGN PATENT DOCUMENTS

JP  2004-287162 A  10/2004
JP  2006-201761 A  8/2006
(Continued)

OTHER PUBLICATIONS

International Search Report for Application No. PCT/JP2014/000619 dated Apr. 15, 2014.

*Primary Examiner* — Andrew Wendell
(74) *Attorney, Agent, or Firm* — Pearne & Gordon LLP (57) ABSTRACT

A current output circuit includes a current mirror circuit that has first and second transistors in each of which a source is connected to a reference voltage, and that outputs a current which is proportional to a drain current of the first transistor, from a drain of the second transistor; a switch that turns ON/OFF the current output of the current mirror circuit; a third transistor in which a gate is connected to a gate of the second transistor; and a bias circuit that applies a first voltage to a drain of the third transistor. The bias circuit switches the first voltage to two different voltages in synchronization with opening/closing of the switch.

8 Claims, 10 Drawing Sheets

(56) References Cited

U.S. PATENT DOCUMENTS

| | | | |
|---|---|---|---|
| 8,188,792 B1* | 5/2012 | Narayan | G05F 3/262 323/315 |
| 8,421,509 B1* | 4/2013 | Chen | H03L 7/0893 327/148 |
| 2004/0189275 A1 | 9/2004 | Yoneyama | |
| 2004/0195981 A1* | 10/2004 | Mizuno | H01S 5/042 315/291 |
| 2006/0128345 A1* | 6/2006 | Ootaka | G06K 19/0701 455/333 |
| 2006/0132180 A1 | 6/2006 | Omori et al. | |
| 2008/0224675 A1* | 9/2008 | Takagi | G05F 1/565 323/275 |
| 2008/0303605 A1* | 12/2008 | Takada | H03F 1/56 333/17.3 |
| 2010/0013449 A1* | 1/2010 | Miki | G05F 1/56 323/282 |
| 2012/0200358 A1* | 8/2012 | Kuang | H03K 5/249 330/257 |

FOREIGN PATENT DOCUMENTS

| | | |
|---|---|---|
| JP | 3908971 B2 | 4/2007 |
| JP | 2010-239484 A | 10/2010 |

\* cited by examiner

(a) OUTPUT OF PULSE GENERATION CIRCUIT (b) DRAIN AND GATE VOLTAGES OF M2 AND M3

(c) OUTPUT CURRENT I2 OF CURRENT MIRROR CIRCUIT

(a) OUTPUT OF PULSE GENERATION CIRCUIT (b) DRAIN AND GATE VOLTAGES OF M2 AND M3

(c) DRAIN AND GATE VOLTAGES OF M8 AND M4

(d) OUTPUT CURRENT I2 OF CURRENT MIRROR CIRCUIT

(a) OUTPUT OF PULSE GENERATION CIRCUIT (b) GATE CHARGE CURRENTS I1 + Δi1 OF M102, M103

(c) DRIVE CURRENT I2

CURRENT OUTPUT CIRCUIT AND WIRELESS COMMUNICATION APPARATUS

TECHNICAL FIELD

The present invention relates to a current output circuit in which the current output can rapidly rise, and also to a wireless communication apparatus including the circuit.

BACKGROUND ART

Recently, techniques of rapidly transmitting large amounts of data become important. In contrast to techniques in which a microwave is used in the method of wireless transmission, those which employ a millimeter wave that can handle a wide frequency bandwidth receive attention. A simple enlargement of the frequency bandwidth, and also a shortening of the interval between transmission and reception are essential techniques for increasing the transmission rate.

On the other hand, in a mobile use which is driven by a battery, when a transmission circuit and a reception circuit are continuously operated, the power consumption is large, and the communicable time is limited. Therefore, necessary circuit blocks are time-divisionally operated.

Consequently, a wireless circuit requires high-frequency operation performance, and a current output circuit which biases the wireless circuit requires high-speed switching operation performance. In the WiFi (registered trademark) standard (for example, IEEE 802.11a) in the microwave band which is widely used in wireless LANs, for example, the interframe space SIFS (Short Inter-Frame Space) is 16 µs. By contrast, in the WiGig (registered trademark) (Wireless Gigabit) which is a new standard, and which uses the millimeter wave band, 3 µs is requested.

Hereinafter, a conventional current output circuit which is exemplified in Patent Literature 1 will be described with reference to FIGS. 9 and 10. Patent Literature 1 relates to a light-emitting device drive circuit that is an example of a current output circuit in which the current output can rapidly rise, and that drives a light-emitting device such as a laser diode to write information on a recording medium such as a CD-R or a CD-RW.

Figure 9:
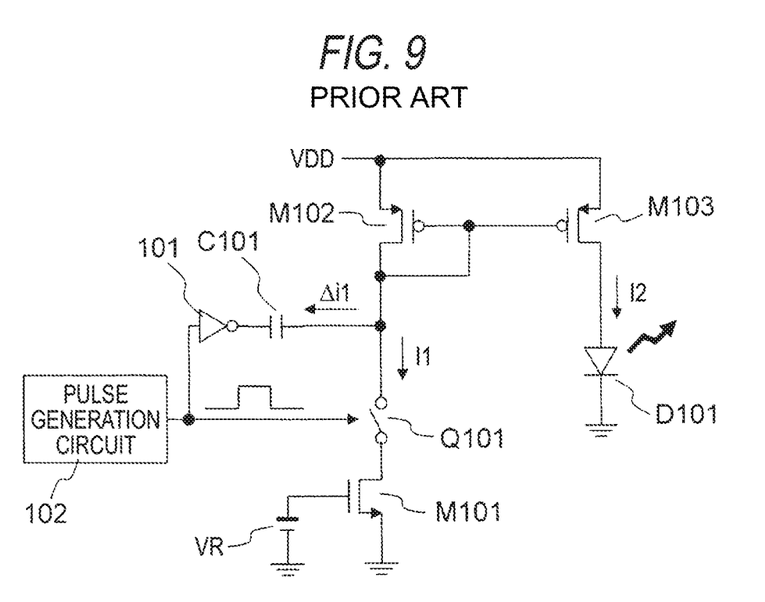
FIG. 9 is a circuit diagram showing the configuration of a light-emitting device drive circuit that is a current output circuit of a conventional example.
Figure 10:
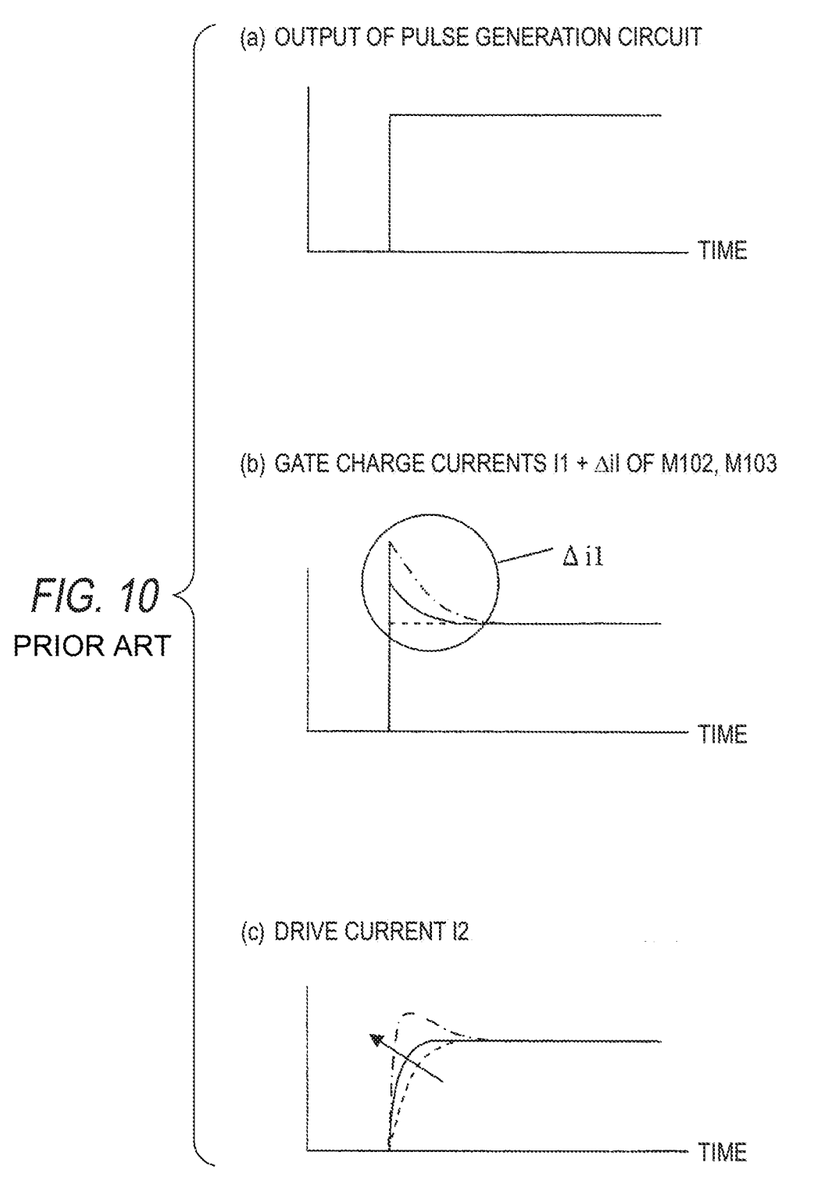
FIGS. 10(a) to 10(c) are views showing waveforms of transient responses of various outputs which are generated in the current output circuit of the conventional example of FIG. 9.

FIG. 9 is a circuit diagram showing the configuration of a light-emitting device drive circuit that is a current output circuit of a conventional example. In the light-emitting device drive circuit of FIG. 9, transistors M102, M103 constitute a current mirror circuit, and an input current I1 is produced in a transistor M101 in which the gate is biased by a voltage source VR.

When a switch Q101 is set to a short-circuit state by a pulse generated by a pulse generation circuit 102, the input current I1 flows through the current mirror circuit, a drive current I2 which corresponds to the current mirror ratio is output from the transistor M103, and a light-emitting device D101 emits light. The pulse generation circuit 102 is further connected to the current mirror circuit through a waveform shaping circuit 101 which inverts the waveform, and a capacitor C101. A compensation input current Δi1 which is a differential waveform of the pulse is produced by the waveform shaping circuit 101 and the capacitor C101.

The operation of the current output circuit of the conventional example of FIG. 9 will be described in detail with reference to FIG. 10. FIG. 10 is a view showing waveforms of transient responses of various outputs which are generated in the current output circuit of the conventional example. FIG. 10(a) shows a waveform in the vicinity of the rising of the pulse generated by the pulse generation circuit 102. FIG. 10(b) shows a synthesized waveform of the input current I1, and compensation input current Δi1 which are input to the current mirror circuit. FIG. 10(c) shows a waveform of the drive current (output current) I2 which is output from the current mirror circuit to drive the light-emitting device.

In FIGS. 10(b) and 10(c), three lines are drawn depending on the level of the compensation input current Δi1. The broken line indicates the drive current in the case where Δi1 is zero, the solid line indicates the drive current in the case where Δi1 is optimally adjusted, and the dash-dot line indicates the drive current in the case where Δi1 is excessive.

Before the input pulse supplied from the pulse generation circuit 102 rises, the switch Q101 is open, and therefore the gate voltages of the transistors M102, M103 are approximately equal to the VDD voltage. When the input pulse supplied from the pulse generation circuit 102 rises and the switch Q101 becomes short circuited, the gate voltages of the transistors M102, M103 are lowered, and a current begins to flow. The transistors M102, M103 have a gate capacitance. Therefore, considerable time is required to charge the gate capacitance, and hence the rising waveform of the drive current I2 is rounded.

The compensation input current Δi1 has a function of accelerating the charging time of the gate capacitance. In the case where the compensation input current is optimally adjusted as shown by the solid lines in FIGS. 10(b) and 10(c), the drive current I2 is stabilized to a predetermined current value in a short time period. The compensation input current Δi1 can be adjusted by the capacitance of the capacitor C101.

CITATION LIST

Patent Literature

Patent Literature 1: Japanese Patent No. 3,908,971

SUMMARY OF THE INVENTION

Technical Problem

It is an object of the disclosure to provide a current output circuit and wireless communication apparatus in which the output current can be rapidly stabilized to a predetermined value.

Solution to Problem

The current output circuit of the disclosure includes: a current mirror circuit that has a first transistor and a second transistor in each of which a source is connected to a reference voltage, and that outputs a current which is proportional to a drain current of the first transistor, from a drain of the second transistor; a switch that turns ON/OFF the current output of the current mirror circuit; a third transistor whose gate is connected to a gate of the second transistor; and a bias circuit that applies a first voltage to a drain of the third transistor. The bias circuit switches the first voltage to two different voltages in synchronization with opening/closing of the switch.

Advantageous Effects of Invention

According to the disclosure, the output current can be rapidly stabilized to a predetermined value.

DESCRIPTION OF EMBODIMENTS

<Background to Contents of Embodiments of Disclosure>

Prior to description of embodiments of the current output circuit and wireless communication apparatus of the disclosure, first, problems in rapid rising of a current output will be described.

In the current output circuit of the conventional example shown in FIG. 9, there is a problem in that, when the gate capacitances of the transistors M102, M103 are varied because of manufacturing variations of the transistors, the rising waveform of the drive current (output current) I2 deviates from the optimum state, and the time elapsing until the current is stabilized is prolonged.

Moreover, a voltage generated across the ends of the capacitor C101 at an input of a pulse is varied also by variation of the power supply voltage VDD, and therefore the compensation input current Δi1 is changed, so that there is a disadvantage that the stabilization time of the drive current I2 is prolonged. In addition, also in the case where a temperature change occurs, the gate voltages of the transistors M102, M103 for causing a predetermined steady current to flow are changed, and the optimum value of the compensation input current Δi1 is changed. Consequently, there is a problem in that the time elapsing until the drive current is stabilized is prolonged.

In view of the above-described problems of the rapid rising of the current output, the disclosure provides a current output circuit and wireless communication apparatus in which, even when the environmental condition such as the temperature or the power supply voltage is changed, or manufacturing variations are caused in transistors, the output current can be rapidly stabilized to a predetermined value.

Embodiments of Disclosure

Hereinafter, embodiments of the disclosure will be described in detail with reference to the drawings. In the drawings which are used in the following description, the identical components are denoted by the same reference numerals, and duplicated description is omitted.

First Embodiment

Figure 1:
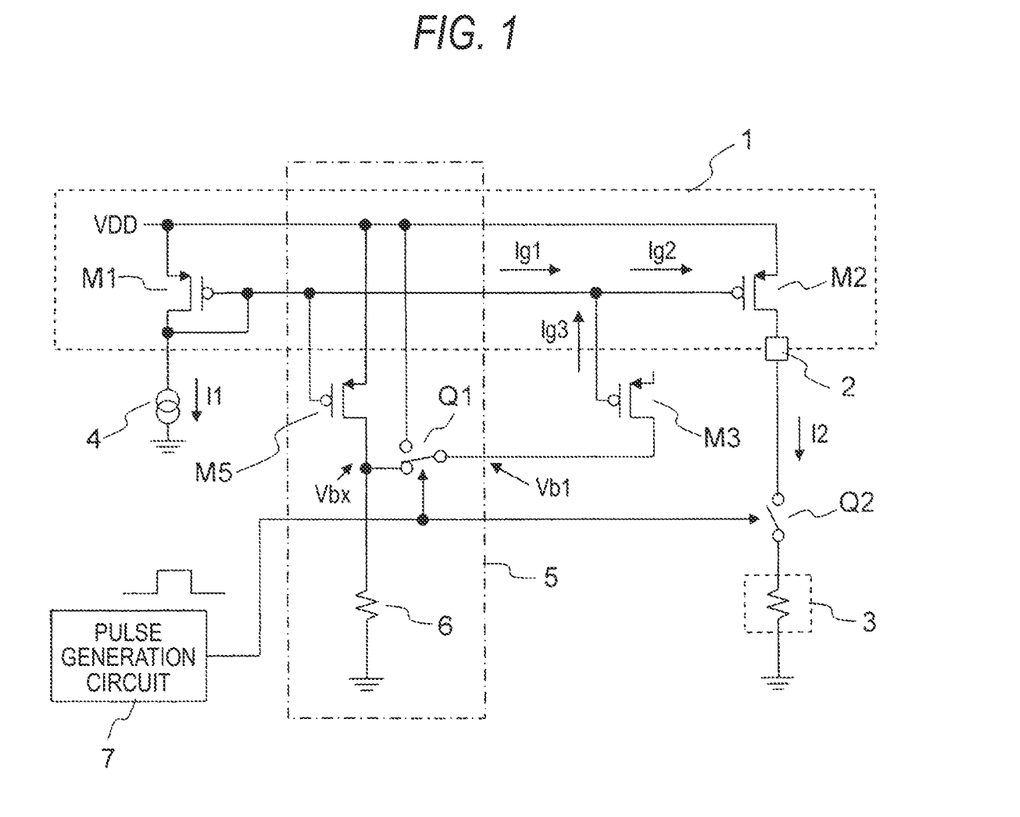
FIG. 1 is a circuit diagram in which a current output circuit of a first embodiment is connected to a load circuit.

FIG. 1 is a circuit diagram in which a current output circuit of a first embodiment is connected to a load circuit.

The current output circuit of the embodiment is a circuit having a current mirror configuration in which the current output can rapidly rise, and includes a gate capacitance charge current compensation transistor for transistors of a current mirror circuit.

The current output circuit has the current mirror circuit 1 configured by a pair of transistors M1, M2. Here, the transistor M1 is disposed as an example of the first transistor, and the transistor M2 is disposed as an example of the second transistor. In the transistors M1, M2, the sources are connected to a predetermined reference voltage (power supply voltage) VDD, the gates are connected to each other, the drain of the transistor M1 functions as an input end, and the drain of the transistor M2 functions as an output end. A current source 4 is connected to the input end of the current mirror circuit 1, and a load circuit 3 is connected to the current output end 2 through a switch Q2.

The current mirror circuit 1 outputs a current that is proportional to the drain current of the transistor M1, from the drain of the transistor M2. In the embodiment, the current mirror circuit 1 receives a current I1 generated in the current source 4, as an input current, and outputs an output current I2 which is determined by the side ratio of the two transistors M1, M2, from the current output end 2.

The output current I2 flows through the switch Q2 which turns ON/OFF the current output of the current mirror circuit 1, into the load circuit 3 having an arbitrary impedance. The switch Q2 is controlled by a pulse which is generated by a pulse generation circuit 7, and set to a short-circuit state during a period when the pulse is at the high level, to allow the current to flow into the load circuit 3.

The current output circuit has a transistor M3 which is an example of the third transistor. The transistor M3 functions as a dummy transistor of the transistor M2. The gate of the transistor M3 is connected to the gate of the transistor M2, the source is in an open state, the drain is connected to a bias circuit 5, and a first voltage Vb1 which is output from the bias circuit 5 is applied to the drain.

The bias circuit 5 has a transistor M5, a switch Q1, and a resistor 6. In the transistor M5, the source and the gate are commonly connected to the transistor M1, and a current is output from the drain. The drain of the transistor M5 is grounded through the resistor 6, and one of switching terminals of the switch Q1 is connected to the drain. When the drain current of the transistor M5 flows through the resistor 6, a predetermined voltage Vbx corresponding to the impedance of the resistor 6 is generated.

The other switching terminal of the switch Q1 is connected to the reference voltage VDD, and the fixed terminal of the switch Q1 functions as an output end of the bias circuit 5, and is connected to the drain of the transistor M3.

The switch Q1 is controlled by the pulse which is generated by the pulse generation circuit 7, and switched in synchronization with the switch Q2 as illustrated. Namely, the switch Q1 is switched to the side of the drain of the transistor M5 during the low-level period of the pulse, and switched to the side of the reference voltage VDD during the high-level period. The first voltage Vb1 is switched between two values of Vbx and VDD by the switching operation of the switch Q1.

As described above, in the case where the first voltage Vb1 is applied to the drain of the transistor M3, the bias circuit 5 switches over the switch Q1 in synchronization with opening/closing of the switch Q2, to switch the first voltage Vb1 to one of the two different voltages (in the embodiment, Vbx and VDD).

In current output circuit, after the rising or falling of the pulse of the output of the pulse generation circuit 7, the gate currents Ig2, Ig3 for charging/discharging the gate capacitances of the transistors M2, M3 flow. Moreover, a difference current Ig1 corresponding to the difference Ig2−Ig3 of the currents flows through the transistor M1.

Figure 2:
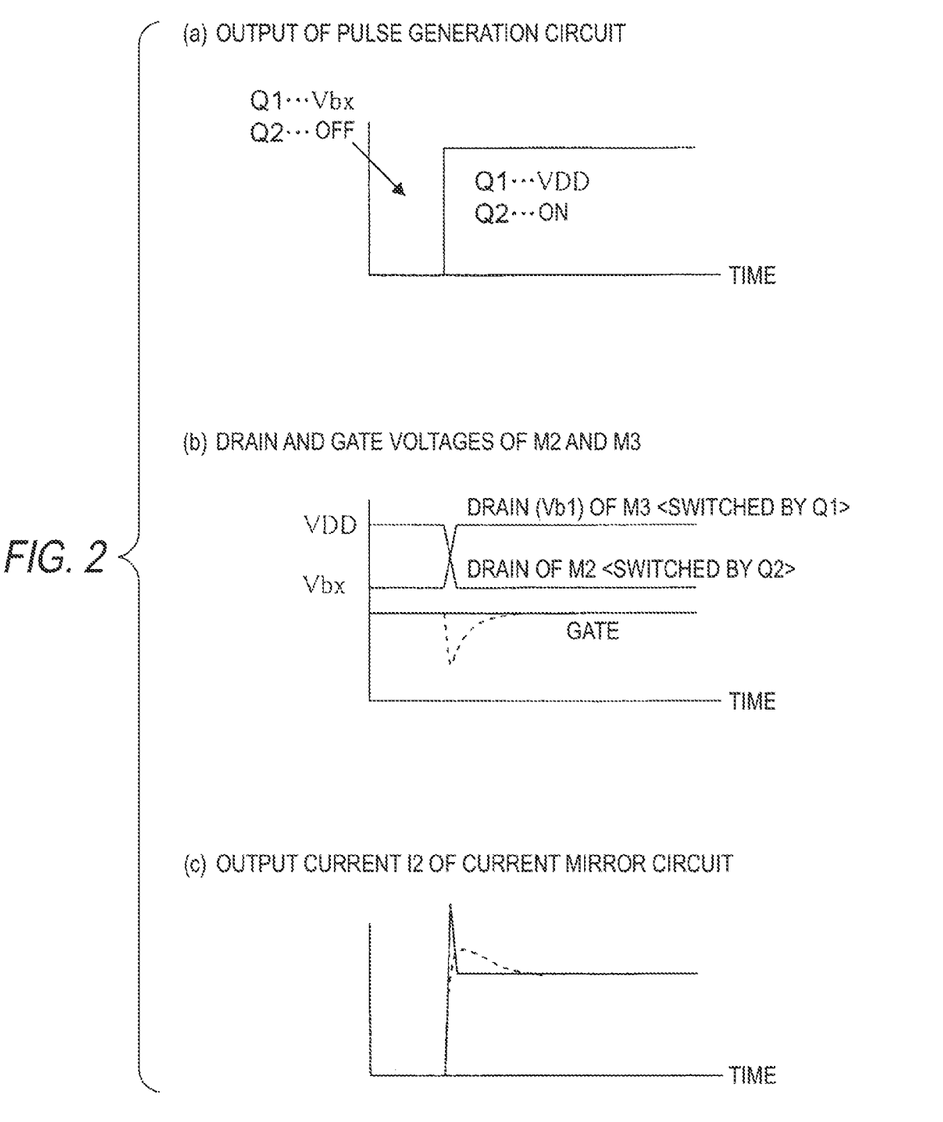
FIGS. 2(a) to 2(c) are views showing waveforms of transient responses of various outputs which are generated in the current output circuit of FIG. 1.

The operation of the thus configured current output circuit will be described in detail with reference to FIGS. 2(a) to 2(c). FIGS. 2(a) to 2(c) are views showing waveforms of transient responses of various outputs which are generated in the current output circuit of FIG. 1. FIG. 2(a) shows a waveform in the vicinity of the rising of the pulse generated by the pulse generation circuit 7. FIG. 2(b) shows the changing manners of the gate and drain voltages of the transistors M2, M3. FIG. 2(c) shows the response waveform of the output current I2 of the current mirror circuit 1.

Referring to FIG. 2(a), during the period when the pulse of the output of the pulse generation circuit 7 is at the low level, the switch Q1 is set to the side of the drain (side of Vbx) of the transistor M5, and the switch Q2 is set to the open state (OFF). By contrast, during the period when the pulse is at the high level, the switch Q1 is set to the side of the source (side of VDD) of the transistor M5, and the switch Q2 is set to the short-circuit state (ON).

As shown in FIG. 2(b), during the period when the pulse is at the low level, the switch Q2 is turned OFF, and therefore the output current I2 does not flow. The drain voltage of the transistor M2 is approximately equal to the reference voltage VDD, and the first voltage Vb1 which is the drain voltage of the transistor M3 is approximately equal to the voltage value Vbx.

When the pulse then rises to the high level, the switch Q2 is turned ON, and therefore the drain voltage of the transistor M2 suddenly falls to a predetermined intermediate voltage. The gate capacitance of the transistor M2 is charged, and therefore the gate current Ig2 flows for a short time period By contrast, when the switch Q1 is switched, the drain voltage Vb1 of the transistor M3 is changed to the reference voltage VDD. Also in the transistor M3, therefore, the gate current Ig3 is caused to flow by the discharging through the gate capacitor.

Here, in the case where the amounts of charges which are caused to flow into/out of the gates of the transistors M2, M3 by the gate currents Ig2, Ig3 are equal to each other, the difference current Ig1 is negligibly small. The gate voltages of the transistors M2, M3 are generated by the flow of the input current I1 through the transistor M1. When the difference current Ig1 is zero, however, the gate voltage is not varied. When the gate voltage is constant, also the drain current flowing through the transistor is constant. After a short-term glitch (caused by an inrush current) due to the gate charge current Ig2, therefore, the output current I2 which is output from the transistor M2 is rapidly stabilized to a steady current as shown by the solid line in FIG. 2(c).

The waveforms indicated by the broken lines in FIGS. 2(b) and 2(c) show transient responses in the case where the gate connection of the transistor M3 is disconnected, in order to compare operations in this case, the gate charge current of the transistor M2 flows through the transistor M1 as the difference current Ig1, and hence the gate voltage of the transistor M2 is reduced once and transiently to a low voltage as indicated by the broken line in FIG. 2(b). Thereafter, the gate voltage is gradually varied with a time constant which is defined by the impedance and gate capacitance of the transistor M1, and also the output current I2 continues to be varied until the gate voltage is stabilized.

As described above, in the case where the amounts of charges which are caused to flow into/out of the gates of the transistors M2, M3 by the gate currents Ig2, Ig3 are equal to each other, the difference current Ig1 is negligibly small, and the stabilization time of the output current is shortened. Therefore, conditions under which the balance between the amounts of charges which flow into/out of the gates of the transistors M2, M3 is attained will be described. The amount of charge stored in the gate capacitor of a transistor is given by a product of the capacitance and the voltage across the ends of the capacitor, and therefore changes of the capacitance and the drain voltage before and after the rising of the pulse will be considered.

Figure 3:
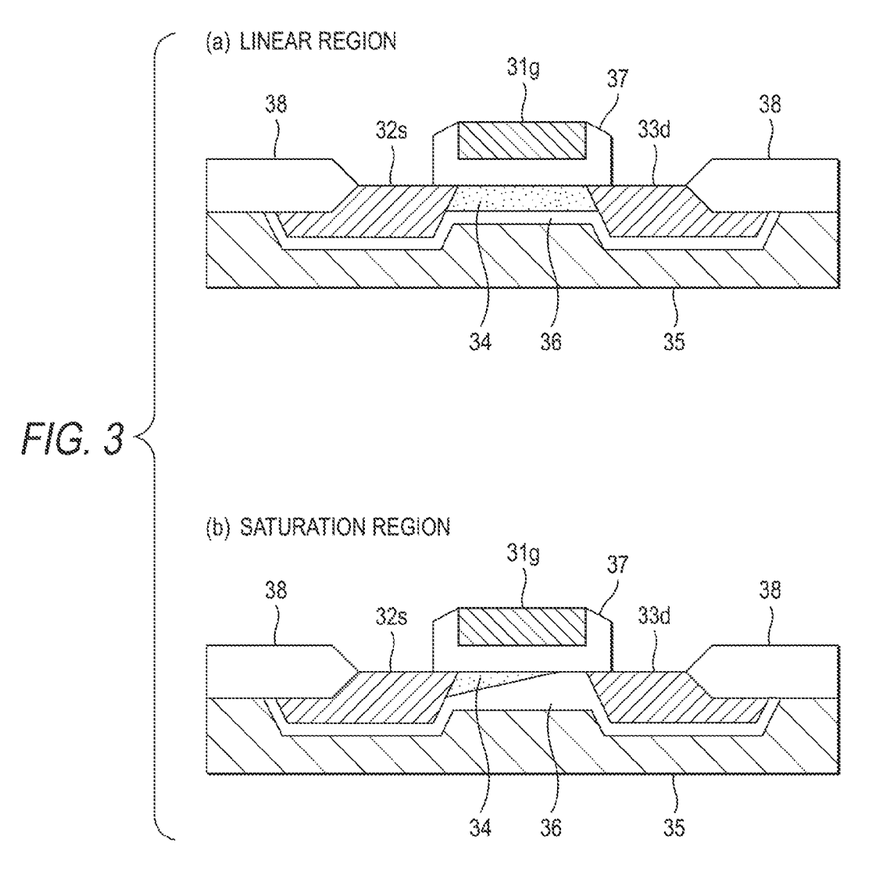
FIGS. 3(a) and 3(b) are sectional views illustrating the operation of the gate capacitance of a MOS transistor.

The gate capacitance of a transistor is mainly configured by a capacitance between the region which is formed immediately below the gate electrode, and which is called a channel, and the gate electrode FIGS. 3(a) and 3(b) are sectional views illustrating the operation of the gate capacitance of a MOS transistor. In FIGS. 3(a) and 3(b), a gate electrode 31g, a source region 32s, a drain region 33d, a channel 34, a substrate region 35, a depletion region 36, a gate oxide film 37, and an element isolation oxide film 38 are respectively shown.

In a MOS transistor, as shown respectively in FIGS. 3(a) and 3(b), the channel region is formed in different manners depending on the value of the gate-drain voltage. In the case where the gate-drain voltage is equal to or higher than a threshold, and the transistor operates in the linear region, the channel 34 is conductive with the source region 32s and the drain region 33d as shown in FIG. 3(a). By contrast, in the case where the gate-drain voltage is equal to or lower than the threshold, and the transistor operates in the saturation region, the channel 34 is conductive with the source region 32s, and not conductive with the drain region 33d, and therefore the depletion region 36 is widened as shown in FIG. 3(b).

The gate capacitance is proportional to the opposing area between the gate electrode 31g and the channel region 34. In the case where the transistor operates in the saturation region, the area of the channel region 34 is reduced, and therefore it is empirically known that the gate capacitance is about two thirds of that in the case where the transistor operates in the linear region. Returning to the operations of the transistors M2, M3 of FIG. 1, in the case where the pulse of the output of the pulse generation circuit 7 rises from the low level to the high level, the operation of the transistor M2 is changed from the linear region to the saturation region, that of the transistor M3 is changed from the saturation region to the linear region, and the value of the gate capacitance is changed in accordance with this.

Next, the change of the drain voltages of the transistors will be considered. The drain voltage of each of the transistors is changed between the reference voltage VDD and the predetermined intermediate voltage. In the saturation region, the drain region 33d is not conductive with the channel 34, and therefore a charge flow into/out of the gate capacitance does not occur even when the drain voltage is changed. In the saturation region, therefore, the drain voltage does not contribute to the charge transfer to the gate capacitance, and hence the variation width of the drain voltage which substantially causes the charge transfer to the gate capacitance is the voltage difference between the voltage at the point where the operation is switched between the linear region and the saturation region, and the reference voltage VDD. In the transistors M2, M3, the gates are commonly connected to each other, and therefore the voltage differences have the same value.

From the above, when the pulse of the output of the pulse generation circuit 7 rises, the amount of charges which are transferred through the gate capacitances of the transistors M2, M3 is as follows.

With respect to the transistor M2, first, the source region 32s which is conductive with the channel 34 is fixed to the reference voltage VDD, and therefore the charges stored in the capacitance which is two thirds of the gate capacitance are maintained and not transferred. The charges which are stored in the remaining capacitance that is one third of the gate capacitance are to be transferred. The drain voltage is substantially changed from VDD to the switching point between the linear region and the saturation region.

Therefore, the amount of charges flowing into the gate of the transistor M2 is $C_{ox}S_2V_{dsc}/3$. Here, $C_{ox}$ indicates the value of the gate capacitance per unit area of the gate electrode, $S_2$ indicates the area of the gate electrode of the transistor M2, and $V_{dsc}$ indicates the voltage difference between the drain voltage at the switching point of the linear region and the saturation region, and VDD.

By contrast, with respect to the amount of charges which flow out from the gate of the transistor M3, the source is in an open state, and therefore charges stored in the whole gate capacitance are transferred when the drain voltage is changed. Namely, the amount of charges which flow out from the gate of the transistor M3 is $C_{ox}S_3V_{dsc}$. Here, $S_3$ indicates the area of the gate electrode of the transistor M3.

In order to equalize the amounts of charges which are caused to flow into/out of the gates of the transistors M2, M3 by the gate current Ig2, Ig3, therefore, it is requested to set $S_3=S_2/3$. Namely, it is requested that the size of the transistor M3 be made one third of that of the transistor M2. The ratio of two thirds at which the gate capacitance of a transistor is changed by transferring from the linear region to the saturation region is an approximate number which depends on the manufacturing method, and the above-described selection of the transistor size is a guideline for the design In the above-described configuration, even when the film pressure of the gate oxide film is changed because of manufacturing variations, and the capacitance $C_{ox}$ per unit area of the gate electrode is varied, the relative values of the gate capacitances of the transistors M2, M3 are not changed, and the balance between the amounts of charges which flow into/out of the gates is maintained Even when the temperature or the power supply voltage is changed, moreover, the voltage difference $V_{dsc}$ between the drain voltage at the switching point of the linear region and the saturation region, and VDD in the transistor M2 is equal to that in the transistor M3, and therefore the balance between the amounts of charges is maintained.

According to the embodiment, even in the case where the environmental condition such as the temperature or the power supply voltage is changed, or manufacturing variations of the transistors occur, therefore, the amounts of charges which flow into/out of the gates of the transistors M2, M3 are balanced with each other at the rise of the pulse of the output of the pulse generation circuit 7, i.e., at the rise of the output current. Therefore, the difference current Ig1 between the gate currents Ig2, Ig3 becomes negligibly small, and transient variations do not occur in the gate voltages, with the result that the output current can be rapidly stabilized to a predetermined value.

In the current output circuit of the embodiment, as described above, the time elapsing until the output current is stabilized to a steady value at the start-up of the circuit can be shortened. Moreover, the rapidity of the stabilization of the output current can be prevented from being affected by manufacturing variations of the transistors, or a variation of the temperature or the power supply voltage.

Although the gate capacitance of a transistor is mainly configured by the above-described capacitance between the gate electrode and the channel, there are small additional capacitances between the gate electrode and the source and drain electrodes. The amount of charges which are transferred through an interelectrode capacitance is proportional to the variation width of the drain voltage, and therefore it is further preferable that the variation widths of the drain voltages of the transistors M2, M3 at the rise of the pulse are made coincident with each other.

Namely, it is preferable to approximately equalize the drain voltage Vbx of the transistor M3 at the low level of the pulse with the drain voltage of the transistor M2 at which the switch Q2 is set to the ON state at the high level of the pulse. According to the configuration, the resistance to a change of the environmental condition such as the temperature or the power supply voltage can be further enhanced.

In the above description, in the configuration of the current output circuit of FIG. 1, the transistors M1, M2, M3, M5 are P-channel MOS transistors. Alternatively, N-channel MOS transistors may be used as the transistors, and a circuit in which currents flow oppositely may be employed.

In the configuration example of FIG. 1, the transistor M3 functioning as a dummy transistor is configured so that the source is in an open state. Alternatively, a configuration where the source is connected to the reference voltage VDD may be employed. The switch Q1 which switches the first voltage Vb1 that is applied to the drain of the transistor M3 may be configured so that a switch for switching the connection between the drain of the transistor M5 and the resistor 6, and that for switching the connection between the drain and the reference voltage VDD are different switches. In this manner, the configuration of the connecting portion of the source of the transistor M3, and that of switching the output voltage of the bias circuit 5 are not limited to the configuration example shown in FIG. 1.

Second Embodiment

Figure 4:
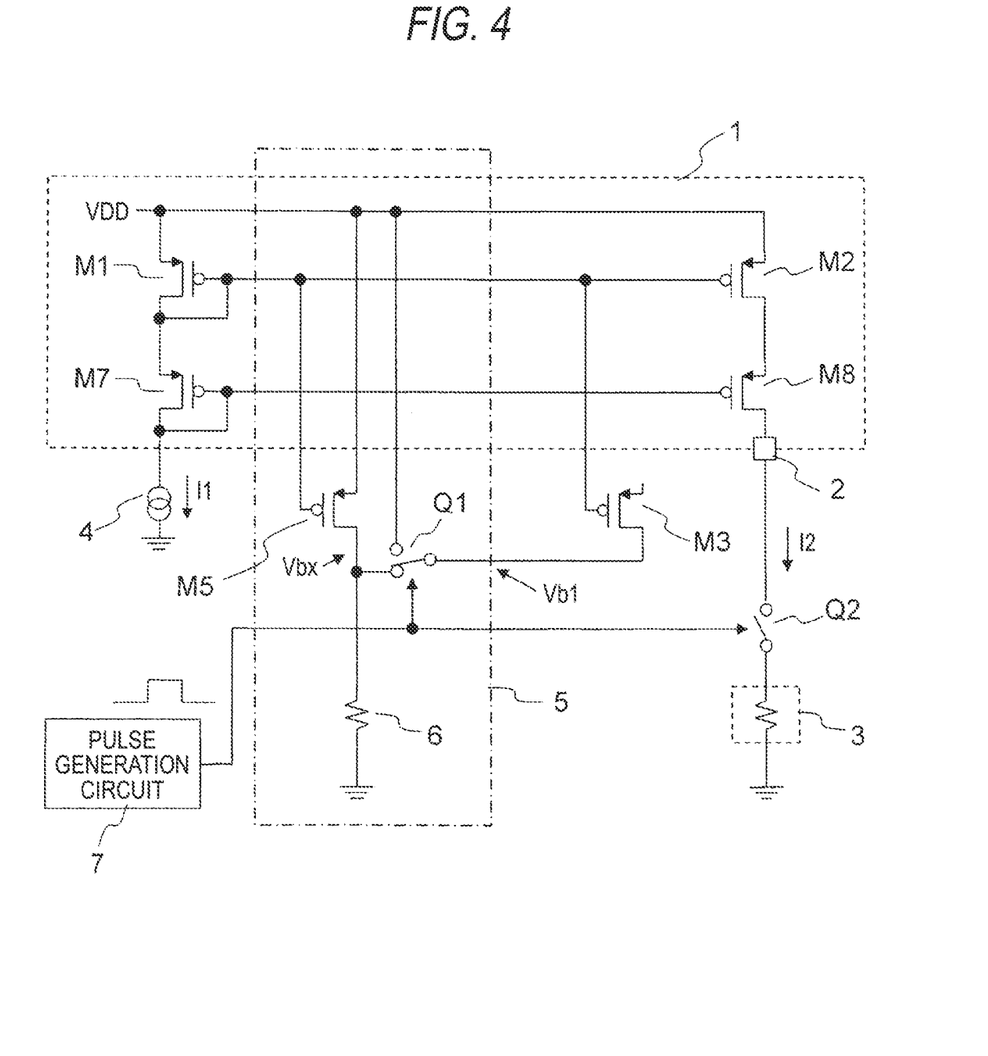
FIG. 4 is a circuit diagram in which a current output circuit of a second embodiment is connected to a load circuit.

FIG. 4 is a circuit diagram in which a current output circuit of a second embodiment is connected to a load circuit.

The second embodiment is different from the first embodiment shown in FIG. 1 in that, in the current mirror circuit 1, a cascode transistor M8 is inserted and disposed between the drain of the transistor M2 and the current output end 2. In the cascode transistor M8, the source is connected to the drain of the transistor M2, and the drain is connected to the current output end 2.

A transistor M7 in which the gate and the drain are connected to each other is inserted and disposed between the drain of the transistor M1 and the current source 4. In the transistor M7, the gate is connected to the gate of the cascode transistor M8, the source is connected to the drain of the transistor M1, and the drain is connected to the current source 4. According to the configuration, the voltage generated in the gate of the transistor M7 is used as the gate bias voltage of the cascode transistor M8. The other configuration is identical with that of FIG. 1.

Figure 5:
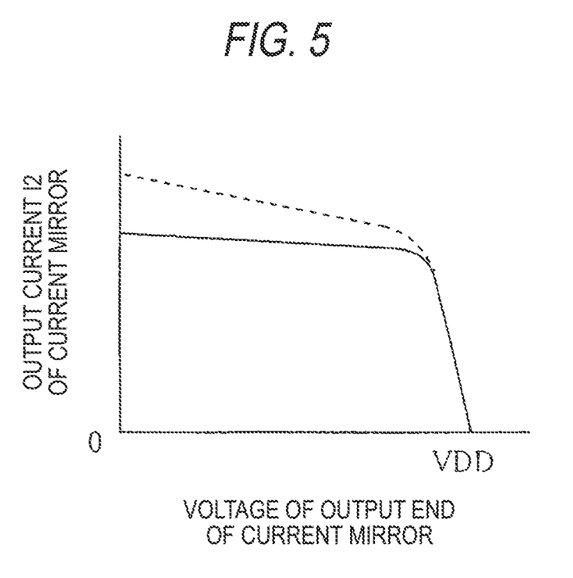
FIG. 5 is a view illustrating an effect of a cascode transistor.

FIG. 5 is a view illustrating an effect of the cascode transistor, and shows the manner of changing the output current I2 in the case where the voltage which can appear at the current output end 2 is changed by the impedance of the load circuit 3.

In FIG. 5, the broken line indicates the characteristics of the output current I2 in the circuit of FIG. 1 in which the cascode transistor M8 does not exist, and, the higher the voltage at the current output end 2, the more gently the output current I2 is reduced. In other words, in the characteristics, the output impedance is not sufficiently high, and the value of the output current is largely varied. By contrast, the solid line indicates the characteristics of the output current I2 in the circuit which has the cascode transistor M8 as shown in FIG. 4. In this case, in the characteristics, the output current I2 is substantially unchanged even when the voltage at the current output end is changed, or the current output circuit exhibits excellent characteristics of maintaining the output current constant.

Also in the current mirror circuit 1 of the second embodiment shown in FIG. 4, in a similar manner as the first embodiment, the current value of the output current I2 has a value which is obtained by amplifying the input current I1 supplied from the current source 4 in accordance with the size ratio of the transistors M1, M2. In order to rapidly stabilize the output current at the rise of the pulse of the output of the pulse generation circuit 7, therefore, it is important to balance the amounts of charges which flow into/out of the gates of the transistors M2, M3, to suppress variations of the gate voltages.

Also in the current output circuit of the second embodiment, therefore, it is requested to set the size of the transistor M3 to about one third of that of the transistor M2. It is preferable that the voltage Vbx generated by the bias circuit 5 is made approximately equal to the drain voltage of the transistor M2 at which the switch Q2 is set to the ON state at the high level of the pulse.

Also in the current output circuit of the embodiment, even in the case where the environmental condition such as the temperature or the power supply voltage is changed, or manufacturing variations of the transistors occur, therefore, the amounts of charges which flow into/out of the gates of the transistors M2, M3 are balanced with each other at the rise of the pulse, and transient variations do not occur in the gate voltages, with the result that the output current can be rapidly stabilized to a predetermined value in a similar manner as in the first embodiment. In the second embodiment, in the steady state after the rise of the pulse, moreover, stabilization can be performed so that the value of the output current is substantially unchanged even when the voltage at the current output end is changed by changing the impedance of the load circuit 3.

Third Embodiment

Figure 6:
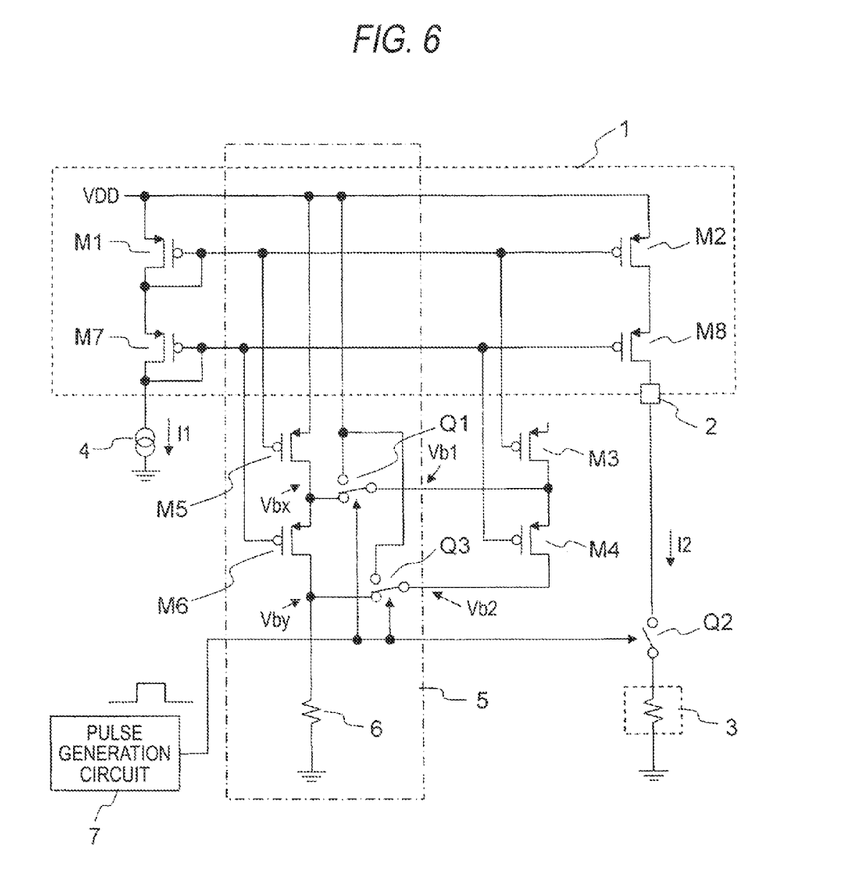
FIG. 6 is a circuit diagram in which a current output circuit of a third embodiment is connected to a load circuit.

FIG. 6 is a circuit diagram in which a current output circuit of a third embodiment is connected to a load circuit.

The third embodiment has a transistor M4 which is an example of the fourth transistor, in addition to the configuration of the second embodiment shown in FIG. 4. The transistor M4 functions as a dummy transistor of the cascade transistor M8. In the transistor M4, the gate is commonly connected to the cascode transistor M8, the source is connected to a first output end of the bias circuit 5 so as to be applied with the first voltage Vb1, and the drain is connected to a second output end of the bias circuit 5 so as to be applied with the second voltage Vb2.

In the bias circuit 5, a transistor M6 is inserted and disposed between the drain of the transistor M5 and the resistor 6. In the transistor M6, the gate is connected to the gate of the transistor M7, the source is connected to the drain the transistor M5, and the drain is connected to the resistor 6 and one of switching terminals of a switch Q3. When the drain current is caused to flow through the resistor 6 by the transistors M5, M6, the predetermined voltage Vbx is generated in the drain of the transistor M5, and the predetermined voltage Vby is generated in the drain of the transistor M6.

The other switching terminal of the switch Q3 is connected to the reference voltage VDD, and the fixed terminal of the switch Q3 functions as a second output end of the bias circuit 5, and is connected to the drain of the transistor M4. The fixed terminal of the switch Q1 functions as a first output end of the bias circuit 5.

The switches Q1, Q3 are controlled by the pulse which is generated by the pulse generation circuit 7, and switched in synchronization with the switch Q2 as illustrated. Here, the switch Q3 is switched to the side of the drain of the transistor M6 during the low level period of the pulse, and switched to the side of the reference voltage VDD during the high-level period. By the switching operations of the switches Q1, Q3, the first voltage Vb1 is switched between Vbx and VDD, and the second voltage Vb2 is switched between Vby and VDD. When the pulse of the output of the pulse generation circuit 7 rises, the first voltage Vb1 is switched from Vbx to VDD, and the second voltage Vb2 is switched from Vby to VDD.

As described above, the bias circuit 5 switches the first voltage Vb1 to two different voltages (in the embodiment, Vbx and VDD), and, in the case where the second voltage Vb2 is applied to the drain of the transistor M4, switches the switch Q3 in synchronization with the opening/closing of the switch Q2 to switch the second voltage Vb2 to two different voltages (in the embodiment, Vby and VDD).

Figure 7:
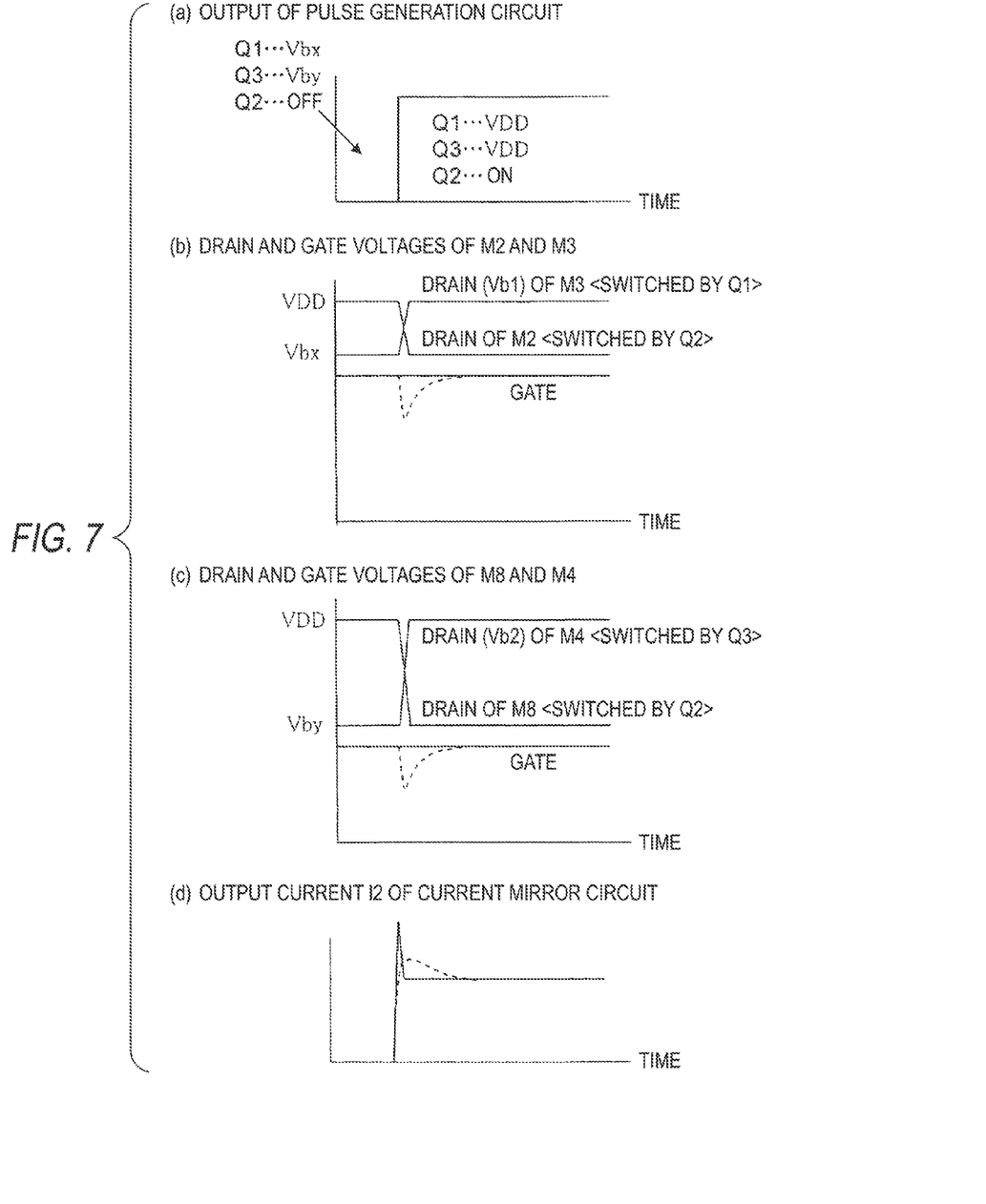
FIGS. 7(a) to 7(d) are views showing waveforms of transient responses of various outputs which are generated in the current output circuit of FIG. 6.

The operation of the thus configured current output circuit will be described in detail with reference to FIGS. 7(a) to 7(d). FIGS. 7(a) to 7(d) are views showing transient responses of various outputs which are generated in the current output circuit of FIG. 6. FIG. 7(a) shows a waveform in the vicinity of the rising of the pulse generated by the pulse generation circuit 7. FIG. 7(b) shows a manner of changing the gate and drain voltages of the transistors M2, M3. FIG. 7(c) shows a manner of changing the gate and drain voltages of the transistors M8, M4. FIG. 7(d) shows the response waveform of the output current I2 of the current mirror circuit 1.

The waveforms indicated by the broken lines in FIGS. 7(b), 7(c), and 7(d) show transient responses in the case where the gate connections of the transistors M3, M4 are disconnected, in order to compare operations.

The pulse of the output of the pulse generation circuit 7 shown in FIG. 7(a) is similar to that in the first embodiment shown in FIG. 2(a).

As shown in FIG. 7(b), the drain voltage of the transistor M3 is given by the first voltage Vb1 of the bias circuit 5. During the period when the pulse is at the low level, the first voltage Vb1 is in the state where the voltage has the voltage value Vbx which is an intermediate voltage, and, when the pulse becomes the high level, the voltage rises from Vbx to the reference voltage VDD. The drain voltage of the transistor M2 is at the VDD voltage because the output current I2 does not flow during the low-level period of the pulse, and, when the pulse becomes the high level, a current flows through the cascode transistor M8, and the voltage suddenly falls to a predetermined intermediate voltage which is determined by the gate-source voltage.

In the operations of the transistors M3, M2, the switching between the linear region and the saturation region is similar to the operation of the above-described first embodiment. Similarly with the first embodiment, when the area $S_3$ of the gate electrode of the transistor M3 is set to about one third of the area $S_2$ of the gate electrode of the transistor M2, therefore, the transfers of charge amounts through the gate capacitances are balanced with each other, and transient variations of the gate voltages are suppressed. The waveform indicated by the broken line in FIG. 7(b) shows the change of the gate voltage of the transistor M2 in the case where the gate of the transistor M3 is disconnected, and is identical with the waveform which has been described in the first embodiment of FIG. 2(b).

As shown in FIG. 7(c), the drain voltage of the transistor M4 is given by the second voltage Vb2 of the bias circuit 5. During the period when the pulse is at the low level, the second voltage Vb2 is in the state where the voltage has the voltage value Vby which is an intermediate voltage, and, when the pulse becomes the high level, the voltage rises from Vby to the reference voltage VDD. The drain voltage of the cascode transistor M8 is at the VDD voltage because the output current I2 does not flow during the low-level period of the pulse, and, when the pulse becomes the high level, and the voltage suddenly falls to a predetermined intermediate voltage which is generated by the flow of the output current I2 through the load circuit 3.

In the operations of the transistors M4, M8, the switching between the linear region and the saturation region is similar to the operation of the above-described first embodiment. When the gate of the transistor M4 is disconnected, the transient gate current which flows in the cascode transistor M8 flows toward the transistor M7, and hence the gate voltage is transiently varied as indicated by the broken line in FIG. 7(c)

The variation of the gate voltage of the cascode transistor M8 exerts a smaller degree of influence on the value of the output current as compared with the variation of the gate voltage of the transistor M2, but is not negligibly small. In the embodiment, therefore, the gate of the transistor M4 is connected to that of the cascode transistor M8, and the transfers of charge amounts through the gate capacitances are balanced with each other, whereby stable characteristics in which transient variations do not appear in the gate voltage as indicated by the solid line in FIG. 7(c) can be obtained. As a result, after a short-term glitch due to the gate charge current, the output current I2 is rapidly stabilized to a steady current as shown by the solid line in FIG. 7(d).

Here, conditions under which the balance between the amounts of charges which flow into/out of the gates of the transistors M4, M8 is attained will be described. Before and after the rising of the pulse, the source and drain voltages of each of the transistors are symmetrically switched between VDD and the intermediate voltage. By the rising of the pulse, moreover, the operation of the transistor M4 is switched from the saturation region to the linear region, the operation of the cascode transistor M8 is switched from the linear region to the saturation region, and hence the ratios at which the value of the gate capacitance is changed are identical with each other. Therefore, it will be easily understood that, in order to balance the amounts of charges which are transferred through the gate capacitances with each other, the sizes of the transistors M4, M8 are requested to be made equal to each other.

According to the current output circuit of the embodiment, the current mirror circuit having the cascode transistor M8 is used. In the steady state after the rise of the pulse, therefore, the output current can be stabilized so as to be substantially unchanged even when the voltage at the current output end is changed by a change of the impedance of the load circuit 3.

At the rise of the pulse, moreover, the amounts of charges which flow into/out of the gates of the transistors M2, M3 and the transistors M8, M4 are balanced with each other, and transient variations of the gate voltages of the transistors M2, M8 which determine the value of the output current are suppressed. Therefore, the output current can be rapidly stabilized to a predetermined value. Similarly with the first embodiment, the effect of rapid stabilization of the output current is maintained even in the case where the environmental condition such as the temperature or the power supply voltage is changed, or manufacturing variations of the transistors occur.

Similarly with the drain voltage Vbx of the transistor M3, it is preferable to approximately equalize the drain voltage Vby of the transistor M4 at the low level of the pulse with the drain voltage of the cascode transistor M8 at which the switch Q2 is set to the ON state at the high level of the pulse. According to the configuration, the resistance to a change of the environmental condition such as the temperature or the power supply voltage can be further enhanced.

Fourth Embodiment

Figure 8:
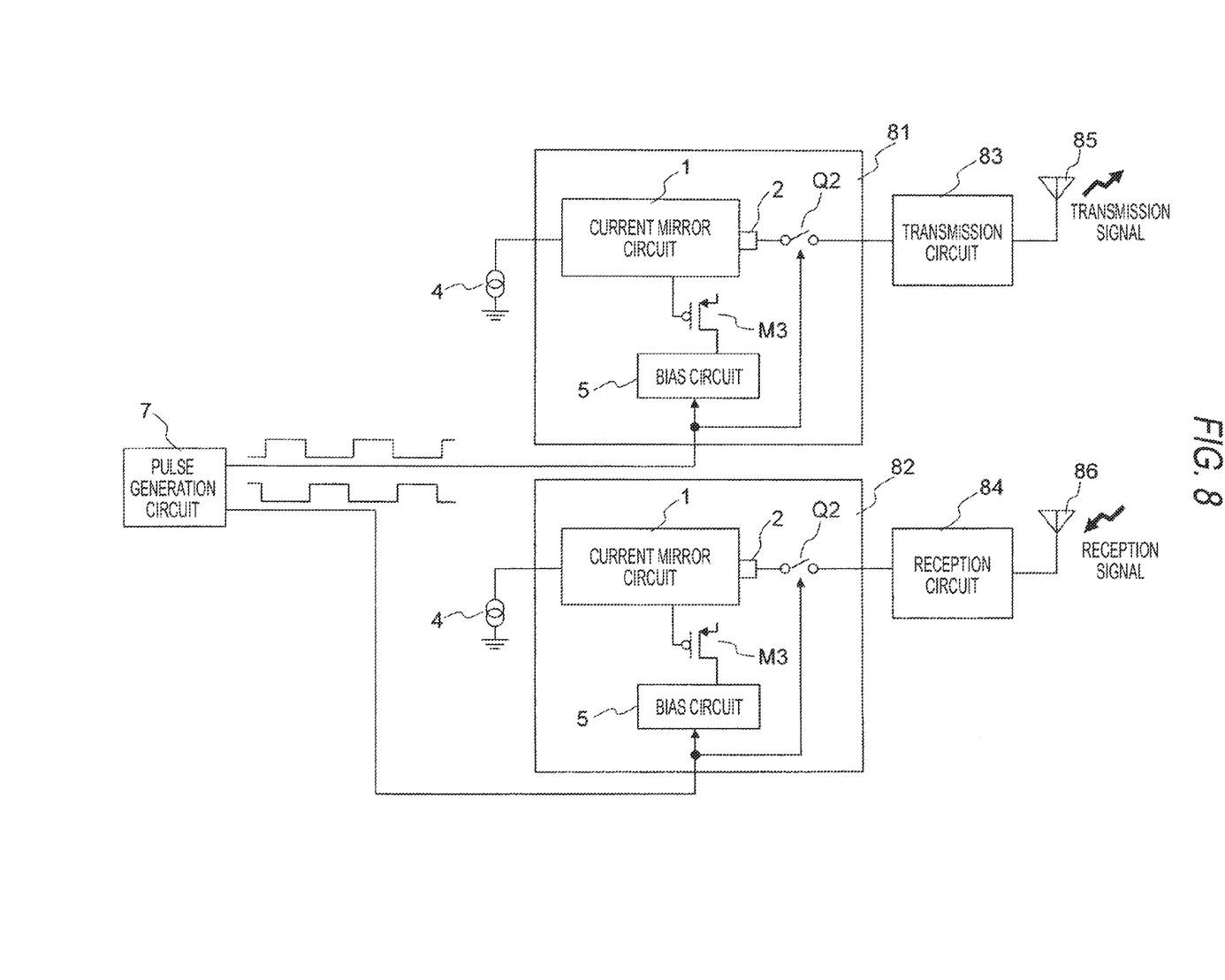
FIG. 8 is a block diagram showing the configuration of a wireless communication apparatus of a fourth embodiment.

FIG. 8 is a block diagram showing the configuration of a wireless communication apparatus of a fourth embodiment. The wireless communication apparatus of the embodiment includes current output circuits 81, 82, a transmission circuit 83, and a reception circuit 84.

The current output circuit 81 and a transmission antenna 85 are connected to the transmission circuit 83. The transmission circuit receives a current supply from the current output circuit 81, and performs a transmitting operation. The current output circuit 82 and a reception antenna 86 are connected to the reception circuit 84. The reception circuit receives a current supply from the current output circuit 82, and performs a receiving operation.

Each of the current output circuits 81, 82 has the current mirror circuit 1 of any one of the above-described first to third embodiments. In FIG. 8, the configuration of the first embodiment is applied as an example, and a circuit including the switch Q2, the transistor M3, and the bias circuit 5 is exemplified.

When the pulse generation circuit 7 selectively sends the pulse to the current output circuits 81, 82, one of the transmission circuit 83 and the reception circuit 84 is activated in a time-divisional manner, and transmission of a transmission signal from the transmission antenna 85, and a process of receiving a reception signal which is received at the reception antenna 86 are switched over.

The transmission circuit 83 has a function of converting a baseband signal which is produced by a baseband circuit, and which contains information of the wireless communication apparatus itself, to a high-frequency signal The high-frequency signal which is converted by the transmission circuit 83 is guided to the transmission antenna 85, and then transmitted as a transmission signal to other wireless communication apparatuses.

The reception circuit 84 has a function of converting a high-frequency signal which is received from another wireless communication apparatus, to a baseband signal. A high-frequency signal which is transmitted from another wireless communication apparatus is received by the reception circuit 84 through the reception antenna 86, and then converted to a baseband signal Thereafter, a process of decoding the baseband signal is performed in the baseband circuit, and the received information is reproduced. In this way, communication with another wireless communication apparatus can be performed.

According to the embodiment, the output currents which are output from the current output circuits 81, 82 are rapidly stabilized at rising of the currents, and therefore the start-up times of the transmission circuit 83 and the reception circuit 84 can be shortened. According to the configuration, in the case where transmission and reception are performed in a time-divisional manner, for example, the interval period between transmission and reception can be shortened. Therefore, a large amount of data can be efficiently communicated in a short time period, ultrahigh-speed communication is enabled, and the apparatus can cope with communication at a high transmission rate.

As various modes of the embodiments of the disclosure, the followings are included.

The current output circuit of the first disclosure includes: the current mirror circuit that has the first and second transistors in each of which the source is connected to the reference voltage, and that outputs the current which is proportional to the drain current of the first transistor, from the drain of the second transistor; the switch that is connected in series to the current output end of the current mirror circuit, and that turns ON/OFF the current output; the third transistor in which the gate is connected to the gate of the second transistor; and the bias circuit that applies the first voltage to the drain of the third transistor, the bias circuit switching the first voltage to two different voltages in synchronization with opening/closing of the switch.

According to the configuration, changes of the amounts of charges stored in the gate capacitances of the second and third transistors can be balanced with each other by both, the changes occurring at switching of the switch. Therefore, an unnecessary current inflow to a circuit which produces the gate voltage does not occur, and hence transient variations of the gate voltage of the second transistor can be suppressed, so that the gate voltage can be maintained to a constant vale. As a result, the current which is output from the current mirror circuit is stabilized to a steady value in a short time period.

Moreover, the gate capacitances of the second and third transistors are changed at the same rate with respect to manufacturing variations. Since the gates of the second and third transistors are commonly connected to each other, the voltage variation widths which are applied to the gate capacitances at the switching of the switch are the same regardless of the temperature or the power supply voltage. In both the transistors, therefore, the amounts of charges which are transferred through the gate capacitances are always coincident with each other. Because of this, an influence due to a change of the temperature or the power supply voltage, or manufacturing variations of the transistors can be suppressed, and the time elapsing until the output current is stabilized can be shortened.

In the current output circuit of the second disclosure, in the current output circuit of the first disclosure, in the open state of the switch, the first voltage which is output by the bias circuit is approximately equal to the voltage which is generated in the drain of the second transistor in the state where the switch is in the short-circuit state, and, in the short-circuit state of the switch, is the reference voltage.

In the current output circuit of the third disclosure, in the current output circuit of the first disclosure, in the open state of the switch, the first voltage which is output by the bias circuit is a voltage at which the third transistor operates in the saturation region, and, in the short-circuit state of the switch, is a voltage at which the third transistor operates in the linear region.

In the current output circuit of the fourth disclosure, in the current output circuit of any one of the first to third disclosures, the current mirror circuit includes the cascode transistor which is inserted between the drain of the second transistor and the current output end, and in which the gate is biased by a predetermined voltage.

In the current output circuit of the fifth disclosure, in the current output circuit of the fourth disclosure, the current output circuit includes the fourth transistor in which the gate is connected to the gate of the cascode transistor, the source is connected to the drain of the third transistor, and the second voltage is applied to the drain from the bias circuit, and the bias circuit switches the second voltage to the two different voltages in synchronization with opening/closing of the switch.

In the current output circuit of the sixth disclosure, in the current output circuit of the fifth disclosure, in the open state of the switch, the second voltage which is output by the bias circuit is approximately equal to the voltage which is generated in the drain of the cascode transistor in the state where the switch is in the short-circuit state, and, in the short-circuit state of the switch, is the reference voltage.

In the current output circuit of the seventh disclosure, in the current output circuit of the fifth disclosure, in the open state of the switch, the second voltage which is output by the bias circuit is a voltage at which the fourth transistor operates in the saturation region, and, in the short-circuit state of the switch, is a voltage at which the fourth transistor operates in the linear region.

The wireless communication apparatus of the eighth disclosure includes: the current output circuit of any one of the first to seventh disclosures; the transmission circuit to which the output current of the current output circuit is supplied; and the reception circuit to which the output current of the current output circuit is supplied, the transmission circuit and the reception circuit being activated in a time-divisional manner.

According to the configuration, in the wireless communication apparatus, the interval period of switching of operation modes of transmission and reception can be shortened.

Although various embodiments have been described with reference to the drawings, it is a matter of course that the disclosure is not restricted to the examples. It is obvious to those skilled in the art that various changes and modifications can be made within the scope of the appended claims, and it is to be understood that they naturally belong to the technical scope of the disclosure. Furthermore, components of the embodiments may be arbitrarily combined with one another without departing from the spirit of the disclosure.

The application is based on Japanese Patent Application (No. 2013-028273) filed on Feb. 15, 2013, the contents of which are incorporated herein by reference.

INDUSTRIAL APPLICABILITY

The disclosure has an effect that an output current can be rapidly stabilized to a predetermined value, and is useful in an industry where a circuit that is to be rapidly activated is used as a current output circuit in which a current output can rapidly rise, and a wireless communication apparatus or the like which includes the circuit.

REFERENCE SIGNS LIST 1 current mirror circuit
2 current output end
3 load circuit
4 current source
5 bias circuit
6 resistor
7 pulse generation circuit
Q1 to Q3 switch
M1 to M7 transistor
M8 cascode transistor
81, 82 current output circuit
83 transmission circuit
84 reception circuit

What is claimed is:

1. A current output circuit comprising:
a current mirror circuit that has a first transistor and a second transistor in each of which a source is connected to a reference voltage, and that outputs a current which is proportional to a drain current of the first transistor, from a drain of the second transistor;
a switch that is connected in series to a current output end of the current mirror circuit, and that turns ON/OFF a current output of the current mirror circuit;
a third transistor whose gate is connected to a gate of the second transistor; and
a bias circuit that applies a first voltage to a drain of the third transistor,
wherein the bias circuit changes the first voltage to two different voltages in synchronization with opening/closing of the switch.

2. The current output circuit according to claim 1, wherein, in an open state of the switch, the first voltage which is output by the bias circuit is approximately equal to a voltage which is generated in the drain of the second transistor in a state where the switch is in a short-circuit state, and in the short-circuit state of the switch, the first voltage is a reference voltage.

3. The current output circuit according to claim 1, wherein, in an open state of the switch, the first voltage which is output by the bias circuit is a voltage at which the third transistor operates in a saturation region, and in a short-circuit state of the switch, the first voltage is a voltage at which the third transistor operates in a linear region.

4. The current output circuit according to claim 1, wherein the current mirror circuit includes a cascode transistor which is inserted between the drain of the second transistor and the current output end, and in which a gate is biased by a predetermined voltage.

5. The current output circuit according to claim 4, wherein the current output circuit includes a fourth transistor in which a gate is connected to the gate of the cascode transistor, a source is connected to the drain of the third transistor, and a second voltage is applied to a drain from the bias circuit; and
wherein the bias circuit changes the second voltage to two different voltages in synchronization with opening/closing of the switch.

6. The current output circuit according to claim 5, wherein, in the open state of the switch, the second voltage which is output by the bias circuit is approximately equal to a voltage which is generated in a drain of the cascode transistor in the state where the switch is in the short-circuit state, and, in the short-circuit state of the switch, the second voltage is the reference voltage.

7. The current output circuit according to claim 5, wherein, in the open state of the switch, the second voltage which is output by the bias circuit is a voltage at which the fourth transistor operates in the saturation region, and, in the short-circuit state of the switch, the second voltage is a voltage at which the fourth transistor operates in the linear region.

8. A wireless communication apparatus comprising:
the current output circuit of claim 1;
a transmission circuit to which the output current of the current output circuit is supplied; and
a reception circuit to which the output current of the current output circuit is supplied,
wherein the transmission circuit and the reception circuit are activated in a time-divisional manner.

* * * * *